(12) United States Patent
Zaoui et al.

(10) Patent No.: US 10,378,928 B2
(45) Date of Patent: Aug. 13, 2019

(54) CALIBRATING A DISTRIBUTED FIBRE OPTIC SENSING SYSTEM

(71) Applicant: AiQ Dienstleistungen UG (haftungsbeschränkt), Böblingen (DE)

(72) Inventors: Wissem Sfar Zaoui, Stuttgart (DE); Clemens Pohl, Holzgerlingen (DE)

(73) Assignee: AIQ DIENSTLEISTUNGEN UG (HAFTUNGSBESCHRÄNKT), Böblingen (DE)

( * ) Notice: Subject to any disclaimer, the term of this patent is extended or adjusted under 35 U.S.C. 154(b) by 0 days.

(21) Appl. No.: 15/849,339

(22) Filed: Dec. 20, 2017

(65) Prior Publication Data

US 2018/0180451 A1     Jun. 28, 2018

(30) Foreign Application Priority Data

Dec. 23, 2016   (GB) .................................. 1622221.8

(51) Int. Cl.

| | |
|---|---|
| *G01D 5/244* | (2006.01) |
| *G01H 9/00* | (2006.01) |
| *G01V 1/00* | (2006.01) |
| *G01D 5/26* | (2006.01) |
| *G01D 5/353* | (2006.01) |

(52) U.S. Cl.
CPC ......... *G01D 5/24452* (2013.01); *G01D 5/268* (2013.01); *G01D 5/35306* (2013.01); *G01D 5/35361* (2013.01); *G01D 5/35387* (2013.01); *G01H 9/004* (2013.01); *G01V 1/001* (2013.01)

(58) Field of Classification Search
CPC ............... G01D 5/24452; G01D 5/268; G01D 5/35306; G01D 5/35361; G01D 5/35387; G01H 9/004; G01V 1/001
See application file for complete search history.

(56) References Cited

U.S. PATENT DOCUMENTS

| | | |
|---|---|---|
| 8,121,442 B2 | 2/2012 | Huffman et al. |
| 2010/0158431 A1 | 6/2010 | Huffman et al. |
| 2013/0275055 A1 | 10/2013 | Hansen et al. |
| 2013/0298635 A1 | 11/2013 | Godfrey |

(Continued)

FOREIGN PATENT DOCUMENTS

| | | |
|---|---|---|
| CA | 2886449 A1 | 6/2014 |
| GB | 2503498 A | 1/2014 |
| WO | WO 2014/088786 A1 | 6/2014 |

OTHER PUBLICATIONS

Extended European Search Report in Application 17219126.3, dated May 4, 2018, EPO, Munich, Germany.

*Primary Examiner* — Hina F Ayub
(74) *Attorney, Agent, or Firm* — Robert A. Blaha; Smith Tempel Blaha LLC

(57) ABSTRACT

A system and method for dynamically calibrating a distributed fiber optic sensing system is disclosed. The calibration system includes a light source for generating pulses of coherent light, an optical fiber arranged at least partly in a ground soil region to guide the light and a photo detector for detecting scattered light returning from the optical fiber in dependence of time. The method includes obtaining information from which a temporal change of an acoustic transfer characteristic of the ground soil region is derivable and calibrating a distributed acoustic sensing system based on the changed acoustic transfer characteristic.

19 Claims, 2 Drawing Sheets

(56) References Cited

U.S. PATENT DOCUMENTS

| | | | |
|---|---|---|---|
| 2014/0150523 A1* | 6/2014 | Stokely | E21B 47/123 73/1.82 |
| 2014/0163889 A1 | 6/2014 | Finfer et al. | |
| 2015/0128706 A1 | 5/2015 | Godfrey | |
| 2015/0346370 A1 | 12/2015 | Martin et al. | |
| 2016/0334543 A1 | 11/2016 | Nagrodsky et al. | |

* cited by examiner

CALIBRATING A DISTRIBUTED FIBRE OPTIC SENSING SYSTEM

CROSS-REFERENCE TO RELATED APPLICATION

This application claims the benefit of the filing date of GB Application Number 1622221.8, filed on Dec. 23, 2016, the disclosure of which is hereby incorporated by reference in its entirety.

TECHNICAL FIELD

The present invention relates to a method for dynamically calibrating a distributed fibre optic sensing system, in particular distributed acoustic sensing system (DAS), and to a distributed fibre optic sensing system, in particular distributed acoustic sensing system, being adapted for dynamical calibration.

TECHNOLOGICAL BACKGROUND

US 2014/0163889 A1 discloses a method of acoustic surveying, wherein distributed optical fibre sensors are used for distributed acoustic sensing wherein a modal analysis of distributed acoustic data obtained in-well is performed for monitoring well integrity. One or more acoustic modes corresponding to distributed speed of sound measurements within the wellbore are performed.

US 2010/0158431 A1 discloses an optical fibre surveillance topology including a single optical fibre for the detection of acoustic signals associated with vibrations or other activity. The fibre is arranged in a two-dimensional topology to improve the spatial resolution of the system. Two or more such oriented fibres may be juxtaposed or overlapped to yield even greater resolution.

US 2015/0346370 A1 discloses a method of calibration for downhole fibre optic distributed acoustic sensing, wherein a vibration tool is positioned at a specified depth in the borehole and two or more distributed acoustic sensing signals are obtained while the vibration tool is activated. The distributed acoustic sensing system is calibrated based on the two or more distributed acoustic sensing signals, the specified depth, the respective specific frequency, and the respective specified amplitude. The method may also comprise disposing two or more geophones at different locations within the borehole to obtain the baseline distributed acoustic sensing signal and the calibration distributed acoustic sensing signal. The vibration tool may be moved to one or more other known depths and the process of obtaining distributed acoustic sensing signals may be repeated.

WO 2014/088786 A1 discloses a calibration of a well acoustic sensing system wherein predetermined acoustic signals along acoustic sensors distributed proximate a well are received and the system is calibrated based on the received acoustic signals. An acoustic source is displaced along an optical waveguide positioned proximate a well, predetermined acoustic signals are transmitted from the acoustic source and the acoustic signals are received with the waveguide and the system is calibrated based on the received acoustic signals. An active sound source is dropped, injected or lowered by cable into a well bore for the purpose of calibrating an optical distributed acoustic sensor. Various vibration speakers, vibrating actuators and acoustic transducers are capable of actively producing sounds within an object. Acoustic signals at several acoustic frequencies as well as extent of the acoustic signals may be used. A measurement of the intensity of the sound energy provides the acoustic sensitivity as a function of position along the distributed acoustic sensor. The sounds can be emitted as continuous single-frequency tones, continuous dual tone multiple frequency, continuous multiple-frequency tones, continuous wide spectrum tones, continuously wide noise, continuous coloured noise, continuously repeating swept-frequency waveforms, continuous pseudo-random waveforms or other continuously repeating complex waveforms. A sensitivity of the waveguide to acoustic energy can depend significantly on how the waveguide is installed in the well and on local variations such as liquids in the well bore. In a calibration procedure, these variations can be compensated for by detecting predetermined acoustic signals transmitted along the waveguide by an acoustic source. By emitting sound in a controlled manner, the distributed acoustic sensing system can measure the acoustic sensitivity as a function of position along the waveguide. The calibration method may include the use of a remote vibratory or impulse seismic source and a calibrated reference receiver such as a three-axis geophone placed adjacent to the distributed acoustic sensor, wherein the calibrated reference receiver is not required, but will improve the accuracy of the calibration by accounting for the signal attenuation and distortion effects caused by the formation between the source and the distributed acoustic sensing sensor. The seismic source can be located either on the surface or in a nearby well. Acoustic signals may be transmitted from, at or near the earth surface.

It has however been observed that accuracy and/or reliability of distributed acoustic sensing results are not in all condition satisfactory, in particular due to improper calibration.

Thus, there may be a need for a method for calibrating a distributed fibre optic, in particular acoustic, sensing system and for an improved distributed fibre optic, in particular acoustic, sensing system being adapted to be properly calibrated.

SUMMARY

The need is satisfied by the subject-matter of the independent claims. The dependent claims specify particular embodiments of the present invention.

According to an embodiment of the present invention, it is disclosed a method for (dynamically) calibrating a distributed fibre optic (in particular acoustic) sensing system, in particular a distributed acoustic sensing system, comprising a light source for generating pulses of coherent light, an optical fibre arranged at least partly in a ground soil region to guide the light and a photo detector for detecting scattered light returning from the optical fibre in dependence of time. Thereby, the method comprises obtaining information from which a temporal change of an acoustic transfer characteristic of the ground soil region is derivable and calibrating the distributed acoustic sensing system based on the changed acoustic transfer characteristic.

According to an embodiment, a distributed fibre optic sensing system comprises a light source for generating pulses of coherent light, an optical fibre arranged at least partly in a region of ground soil to guide the light, a photodetector for detecting scattered light returning from the optical fibre in dependence of time, an information receiver configured to obtain information from which a temporal change of an acoustic transfer characteristic of the ground soil region is derivable and a calibrator configured to calibrate the distributed acoustic sensing system based on the changed acoustic transfer characteristic.

Overview of Embodiments

The method may be performed from a distributed fibre optic, in particular acoustic, sensing system according to an embodiment of the present invention. The method may enable to dynamically calibrate the distributed acoustic sensing system, thus to calibrate the distributed acoustic sensing (DAS) system at different time instances, in particular in response to changing environmental conditions, such as rainfall, precipitation, humidity affecting in particular the ground soil region in which the fibre is at least partially arranged.

The light source may be a coherent light source, such as a laser. The pulses of the coherent light may be repeatedly generated. The pulses of coherent light may be characterized by a pulse width and a frequency or wavelength of the generated light. The repetition frequency to emit the pulses may also be referred to as sampling frequency. The optical fibre may exhibit material inhomogeneity resulting in an inhomogeneity of an index of refraction along the optical fibre. Due to the inhomogeneity of the index of refraction, the coherent light entering at one end of the optical fibre may be backscattered (in particular Rayleigh-backscattered) from different regions along the optical fibre. When the optical fibre is exposed to an acoustic influence from the environment, i.e. in particular the material in the ground soil region, the scattering properties along the fibre may change. The change of the scattering property along the fibre may be detected by the photo detector, in particular spatially resolved in dependence of the position along the fibre where the acoustic distortion or acoustic influence along the fibre is present.

The disturbing acoustic sensing system may provide strain sensing along the optical fibre. Thereby, the optical fibre may become the sensing element of a locally altered the backscattering property in dependence of the acoustic influence from the environment. For example, a coherent laser pulse may be sent along the optical fibre and scattering sites within the fibre may cause the fibre to act as a distributed interferometer with a gauge length approximately equal to the pulse length (also referred to as pulse width, i.e. the duration of the individually pulse).

The photo detector is adapted to measure the intensity of the reflected or backscattered light as a function of time after transmission of the laser pulse. When the pulse has had time to travel the full length of the optical fibre and back, the next laser pulse may be sent along the fibre. Changes in the reflected intensity of successive pulses from the same region of fibre may be caused by changes in the optical path length (in particular related to the (local) index of refraction) of that section of the optical fibre. The light may for example have a wavelength between 400 nm and 3000 nm, in particular around 1500 nm. The distributed acoustic sensing system may be enabled to measure strain or acoustic distortion along a length of 40 to 50 km. Thus, the optical fibre may have a length between 40 and 50 km or less or even more. The duration of the pulses (the pulse width) may for example be between 10 ns and 500 ns, in particular around 100 ns. Thereby, a spatial resolution may be between 5 m and 30 m, in particular around 10 m.

The amount of the backscattered light received by the photo detector may be proportional to the pulse length. However, the larger the pulse length, the larger (i.e. worse) is the spatial resolution. The sampling frequency or acquisition rate may be between 500 Hz and 5 kHz, in particular around 1 kHz. The light which is received and detected by the photo detector may have the same frequency as light generated by the light source and guided or supplied into the optical fibre. The distributed acoustic sensing may rely on the physical process that light is backscattered from small variations in the refractive index in the optical fibre (Rayleigh backscattering).

According to embodiments of the present invention, the optical fibre may for example be buried within the ground soil region in a depth of between 1 m and 5 m below the surface of the earth. Thus, the optical fibre may be arranged substantially horizontally below the surface of the earth.

The information may be obtained using an electrical cable, an optical fibre or a wireless technology. The information may for example related to two time points, for example an initial time point and a current time point. From the information it is derivable that the acoustic transfer characteristics of the ground soil region changes from the acoustic transfer characteristics at the initial time point to the changed acoustic transfer characteristics at the current time point.

The acoustic transfer characteristic may for example comprise an acoustic damping characteristics (such as a damping factor per traversed length) of the ground soil region indicating a degree of damping when a particular acoustic signal is transferred through the ground soil region, in particular damping per travelling distance or transfer distance. Thus, according to this embodiment of the present invention, a change of a damping characteristic of the ground soil region is accounted for in the calibration method.

The method may provide a spatially resolved dynamic calibration which takes into account temporally changing environment of the optical fibre. The optical fibre may in particular be arranged close to an object to be monitored, such as a pipeline, a cable, a tube or the like.

The method may further comprise to derive the changed acoustic transfer characteristics based on the information obtained. For example, the damping characteristics of the ground soil region may depend on the humidity of the ground soil region, in particular changing along the optical fibre. For example, at subregions of the ground soil region, the humidity may assume different values, in particular due to different precipitation from clouds above the surface below of which the ground soil region is located in which the optical fibre is at least partly arranged.

Embodiments of the present invention relate to distributed fibre optic sensing application and more particularly but not exclusively to distributed acoustic sensing (DAS) systems. Such systems may enable to monitor different kinds of objects, such as pipelines, power cables, rails, roads, fences, etc. which are installed over lengths ranging from a few meters to several kilometers. Monitoring these installations or objects may involve real-time surveillance and alarming for any kind of threatening disturbances (in particular acoustic disturbances), thereby indicating the location of the disturbance within a certain resolution or accuracy range. A disturbance thereby may involve a direct perturbation or damage of the system functionality, such as a cable fault, pipeline leak, etc. or may be represented as an indirect perturbation which may lead to the system dysfunctionality such as third party intrusion including excavations in the vicinity of the object, object dropping on the installation, etc.

The fibre optic sensing system may be based on using of several optical fibres in general installed within or outside the object or asset, connected to an interrogator including at least one light emitting source, such as a laser, a light receiver, such as a photodiode, and all optical and electrical components and software for signal generation, manipulation, processing and analysis. The physical quantity to be investigated may be any of an acoustic wave, vibration, strain, temperature, etc. that is applied on the optical fibre and evaluated by the interrogator.

Acoustic signals may originate from the direct or the indirect perturbation of the object monitored. Depending on the arrangement and configuration of the fibre optical cable in relation to the monitored object or asset, the soil texture and composition or the weather conditions, the effect of the perturbation occurring at the monitored object can vary all along the object or asset. This may mean that inferring the perturbation at the object from the light received by the receiver may require information regarding the (acoustic) transfer characteristics of the ground soil between the object or asset and the section of the optical fibre close to the perturbation. One certain perturbation can have different impacts (on the refractive index of the optic fibre) at different locations and hence may lead to inability to the interrogator to make a correct interpretation of the perturbation and non-alarming or false alarming of the threat. In general, the recognition of the disturbance (occurring at the object or asset) may be enabled through a comparison with pre-existing patterns (of received signals) in a database or a real-time analysis of the signal content, such as intensity, frequencies, etc.

Especially for the case where the disturbance comprises an acoustic disturbance, the sensitivity of the system may strongly depend on the propagation ability (in particular acoustic transfer characteristics) of the acoustic waves in the medium between the object and the section of the optical fibre. The soil conditions may in general not be constant all along the length of the optical fibre and not all along the length of the object to be monitored due to the geographically and topological variations and property. For example a fibre optical cable to monitor a subsea/underground power cable relating offshore and onshore substations, a pipeline going through rocky, sandy and muddy regions may exhibit different sensitivities along the fibre optical cable. For example, the different soil properties may exhibit different absorption coefficients, for example exhibit different damping properties, and hence may have a large impact on the acoustic wave attenuation and signal distortion.

Embodiments of the present invention account for the spatial and temporal change of the acoustic transfer characteristic in a calibration procedure. Embodiments of the present invention consider and take into account spatially and temporarily changing condition. Further, embodiments of the present invention take into account changing, in particular temporarily changing, propagation conditions of perturbation in the environment, in particular ground soil, surrounding the object under monitoring.

Calibration may involve the adjustment of the system and alarm parameters, such as the emitter and receiver input or output values, the signal threshold, the spatial resolution, the sampling frequency, etc. for a more accurate comparison with the reference pattern. Alternatively, a calibration may be realized by the generation of a new reference signal based on a calibration unit which enables an expansion of the database.

In the prior art, a lack of a dynamic calibration method or a non-adaptation of the reference database may lead to a short validity of the calibration process due to the temporal change of the soil properties. This may induce failing or improper alarming or incorrect interpretation of possible threatening events (taking place at the monitored object), which may have a large impact on the objects or assets.

Embodiments of the present invention enable to automate the calibration procedure thereby, the commissioning of the fibre optic sensing systems may be simplified and a manual re-calibration cycle may be dispensed with.

According to embodiments of the present invention, a spatial dependence due to the different geographical properties of the soil conditions may require an initial calibration of the sensing system to make a correct interpretation of optical measurement results evolving from different sensors or zones of the optical fibre. Embodiments of the present invention detect and take into account a temporal dependence of the ground soil properties (in particular acoustic transfer characteristic) due to, for example, varying weather conditions and/or humidity or due to other external influences. Embodiments enable a dynamic calibration in order to adapt the sensitivity of the sensing system for correct signal recognition and accurate alarming. Varying weather conditions may imply for example changing water content in the soil after raining or after dry seasons and hence may affect the acoustic wave propagation in the medium surrounding the object to be monitored, in particular between the object to be monitored and the particular section of the optical fibre.

An initial calibration may for example involve generation of a predetermined initial acoustic signal having a predetermined magnitude or intensity. The initial acoustic signal may be transferred through (a portion of) the soil ground region and may be detected (using the distributed acoustic sensing system or a particular acoustic receiver, such as a geophone, microphone). The received initial acoustic signal may have a magnitude or intensity which is determined by the respective receiver. The initial calibration may in particular be performed spatially resolved, i.e. in a number of sections or zones of the optical fibre being arranged in potentially different ground soil environments having different material properties and in particular different acoustic transfer characteristics.

After the initial calibration, one or more calibration operations may be performed, either periodically or in particular in response to changing environmental conditions, such as precipitation, rainfall which may also be spatially resolved. The one or more further calibrations may also involve generation of an acoustic signal having a predetermined magnitude or intensity, in particular having the same intensity as the initial acoustic signal used for the initial calibration. In particular, as for the initial calibration, the further acoustic signals may be generated and transferred in different zones or regions of the ground soil surrounding the optical fibre. The further calibration signal may also be received and its intensity may be detected (either by the distributed acoustic sensing system or by a particular acoustic receiver). The further calibration signal detected may have a particular intensity. By comparison of the intensity of the initial acoustic signals received and the further acoustic signals received, a dynamic recalibration may be performed. For example, when the intensity of the received further calibration signal is lower than the intensity of the received initial calibration signal, it may indicate that the ground soil surrounding the optical fibre has a larger damping effect on the acoustic signal than during the initial calibration. Accordingly, one or more calibration parameters of the optical fibre sensing system may be adapted to account for the change of the damping properties of the ground soil surrounding the optical fibre.

According to an embodiment of the present invention, obtaining the information comprises obtaining spatially resolved information pertaining to at least two subregions of the ground soil region.

Thereby, a spatially resolved calibration of the fibre optic sensing system, in particular the distributed acoustic sensing system, may be performed. In particular, different sections or zones along the optical fibre may be associated with different calibration parameters. Light signals from different sections of the optic fibre may be distinguished by recording the time instances at which different light portions are received by the photo detector.

According to an embodiment of the present invention, the obtaining the information comprises obtaining influence information about an influence factor effecting a temporal change of the acoustic transfer characteristic and estimating a changed acoustic transfer characteristic based on the influence information.

The influence factor may for example comprise a humidity, a water content, frost, fallout of water or of particular material or the like. For example, rainfall onto the surface of the earth above the ground soil region in which the optical fibre is partly arranged may lead to an increase of the humidity of particular subregions of the ground soil region. The increased humidity or water content in particular subregions may increase the damping properties for the transfer of acoustic waves or acoustic signals. The change of the damping property may be estimated from knowledge concerning the increased water content or humidity and based on physical models. In other embodiments, the influence factor is directly measured, for example by a humidity sensor or using water content measurement. The influence information may be obtained from external information sources, such as weather information sources.

According to an embodiment of the present invention, obtaining the influence information comprises acquiring weather information regarding atmospheric precipitation from a weather information source, in particular available over the internet, in particular from at least two weather stations in at least to subregions and/or from a surveillance drone.

Thereby, the information may be easily obtained. The weather information may comprise weather information which is spatially resolved. Thereby, the method may easily be implemented.

According to an embodiment of the present invention, geographical coordinates along the optical fibre are transmitted to the weather information source and spatially resolved atmospheric precipitation data are received. Thereby, a spatially and temporarily resolved calibration of the optical fibre sensing system may be enabled.

According to an embodiment of the present invention, depending on whether the atmospheric precipitation data indicate fallout (of water) above a threshold in at least one of the subregions, calibrating is initiated in the respective subregion.

If the fallout is below the threshold, it may be estimated that the acoustic transfer characteristic of the ground soil region is only marginally changed without substantially affecting accuracy of measurement results of the fibre optical system. Thereby, unnecessary recalibration may be avoided. However, when the precipitation data indicate fallout (in particular of water) above a threshold, the transfer characteristics of the ground soil region may, in particular in at least one subregion, be dramatically changed for a recalibration to be required, in order to, also after the change of the transfer characteristic, achieve correct measurement results.

According to an embodiment of the present invention, based on the atmospheric precipitation data, the acoustic transfer characteristic, in particular a damping property, of the ground soil region is estimated, in particular spatially resolved for at least two subregions within the ground soil region. With the estimated damping property, a readjustment of calibration parameters may be performed. The damping properties may be estimated using a physical or geological model taking into account the (physical/chemical) constitution of the (subregions of the) ground soil region.

According to an embodiment of the present invention, humidity data of the ground soil region is determined by measuring using humidity sensors or by estimating using atmospheric precipitation data and a ground soil characteristic, wherein acoustic transfer characteristic of the ground soil region is estimated from humidity data and the ground soil characteristic.

The humidity data may for example comprise data regarding the water content within the ground soil region. The ground soil characteristic may comprise information regarding the material, particle size and so on of the ground soil.

According to an embodiment of the present invention, humidity data of the ground soil region or at least changes in soil conditions are gathered from the catalytic corrosion voltage sensors which are often installed along grounded pipelines. Such sensors are installed in combination with cathodic corrosion protection means and monitor the electrical voltage or current between an electrode and the pipeline. The measured electrical data also depends on soil conditions and therefore can be used as an indicator of a change in soil conditions. The measured electrical data may represent information from which a temporal change of an acoustic transfer characteristic of the ground soil region. The electrical data may be transmitted to the DAS. With the gathered electrical data a calibration of the DAS system may be performed.

According to an embodiment of the present invention, the calibration comprises adjusting at least one calibration parameter of the acoustic sensing system based on the estimated changed acoustic transfer characteristic.

The calibration parameter may relate to the generation or emission of the coherent light pulse, may relate to the receiving or detection of the backscattered light or may relate to the processing of the detected light. Thereby, a calibration may easily be achieved.

According to an embodiment of the present invention, the obtaining the information comprises measuring a temporal change of an acoustic transfer characteristic of the ground soil region.

The measurement may involve generation of acoustic signals, transferring the signals through (at least a portion of) the ground soil region and detecting the transferred acoustic signals. The temporal change may be deduced from respective measurements at at least two different time points, for example an initial time point and a current time point. If the measurement results differ, then a temporal change of the acoustic transfer characteristics can be inferred.

According to an embodiment of the present invention, measuring the temporal change of an acoustic transfer characteristic of the ground soil region comprises generating a predetermined acoustic pattern from at least one, in particular at least two, acoustic source(s) in a vicinity of the optical fibre at at least two locations, transmitting the generated acoustic pattern through at least a portion of the ground soil region and detecting an intensity pattern of the transmitted acoustic pattern.

The acoustic source may for example comprise a loudspeaker. The acoustic sources may be fixedly arranged in different subregions of the ground soil region, in order to allow a spatially resolved calibration. The acoustic sources may in particular distributed within the ground soil region such that only one acoustic source is arranged within a region having a same ground soil characteristics, i.e. same or similar soil material and soil particle size. Initially, ground soil characteristic surrounding the optical fibre in the different subregions may be determined using geologically or geographical (e.g. measurement) data. This may enable to advantageously place the different acoustic sources. Setting the detected transmitted acoustic pattern in relation to the generated acoustic pattern may enable to derive one or more calibration parameters.

According to an embodiment of the present invention, the acoustic source is, in particular substantially horizontally, movable and is mounted on a vehicle configured to drive on a surface of the earth above, in particular laterally close to, the optical fibre.

When the acoustic source is movable using a vehicle driving on the surface of the earth, the calibration in different locations of the optical cable may be simplified. In this case, only a single acoustic source mounted on the vehicle may be sufficient to effectively carry out a spatially and temporarily resolved calibration.

According to an embodiment of the present invention, the vehicle has a geophone attached that may partly be inserted from above the surface into the soil ground region for detecting the transmitted acoustic pattern. Thereby, the vehicle also carries a receiver for receiving the acoustic signals transferred through a portion of the ground soil region. Thereby, the method may further be simplified.

According to an embodiment of the present invention, the transmitted acoustic pattern is not detected by an additional acoustic receiver, such as a microphone or a geophone, but using the distributed acoustic sensing system. Thereby, an additional acoustic receiver can be dispensed with, thereby simplifying the method.

According to an embodiment of the present invention, detecting the transmitted acoustic pattern comprises detecting the transmitted acoustic pattern using at least two acoustic receivers, in particular a microphone and/or a geophone, located at different locations near the optical fibre.

The two acoustic receivers may be arranged in particular close to the optical fibre, such as less than 1 m away from the optical fibre. In other embodiments, the acoustic receivers may be farther away from or closer to the optical fibre.

According to an embodiment of the present invention, calibrating comprises comparing the transmitted acoustic pattern detected by the distributed acoustic sensing system and the transmitted acoustic pattern detected by at least two acoustic receivers and adjusting at least one calibration parameter of the acoustic sensing system based on the comparison/difference.

In this embodiment, the transmitted acoustic pattern detected by the at least two acoustic receivers may serve as a reference. In particular, advantageously, the receiver should be spaced apart at a similar distance from the acoustic sources as the (section of the) optical fibre is spaced apart from the acoustic source(s). In this case, an attenuation of an intensity of a transfer acoustic signal should be similar for the acoustic receiver as well as for the optical fibre, assuming that the acoustic transfer characteristics are similar or the same. The method may further comprise to derive a difference between the transmitted acoustic pattern detected by the distributed acoustic sensing system and the transmitted acoustic pattern detected by the at least two acoustic receivers. Herein, the detection of the pattern is a spatially resolved detection. Thus, the transmitted acoustic pattern which is detected is related to a particular zone or section of the optical fibre. To this zone, one of the at least two receivers is associated (in particular the receiver closest to this zone of the optical fibre). The difference of the detected signal detected by the distributed sensing system and the respective receiver in the respective subregion is calculated and the calibration parameter (for this particular subregion or section of the optical fibre) is adjusted based on the comparison or the difference calculated relating to this particular subregion or section of the optical fibre.

According to an embodiment of the present invention, the calibration parameter comprises at least one of an alarm threshold, a light source intensity, a receiver sensitivity/amplification gain, a spatial resolution, a sampling frequency, in particular a time between two pulses, a pulse width, in particular a pulse duration. Other calibration parameters are possible.

According to an embodiment of the present invention, the method further comprises initially calibrating the distributed acoustic sensing system based on a known initial acoustic transfer characteristic of the ground soil region in at least two subregions of the ground soil region.

The initial acoustic transfer characteristics may be estimated from the ground soil constitution or may be measured.

According to an embodiment of the present invention, the calibrating is automatically triggered when a change of the acoustic transfer characteristics is indicated or detected. The change of the acoustic transfer characteristics may for example be indicated when a heavy rainfall or precipitation occurs. In particular, the calibrating may be locally performed in only those subregions of the ground soil region in which a change of the acoustic transfer characteristic is indicated. Thereby, processing resources may be reduced.

In other embodiments, the calibrating may be periodically performed, such as once per day, once per week, once per month, or the like.

According to an embodiment of the present invention, the method further comprises receiving information regarding planned or ongoing acoustic disturbances in at least one subregion of the ground soil region, in particular due to construction work, and adjusting an alarm threshold of the distribute acoustic sensing system in the respective subregion, in order to reduce false alarm.

When the distributed acoustic sensing system detects a perturbation having an intensity above the alarm threshold, the distributed acoustic sensing system may indicate an alarm. The alarm may alert personnel that a fault or damage or dysfunction of the monitored object occurs in a particular subsection or subregion. When however the detected perturbation is due to an activity not related to the monitored object, a false alarm may be given in a conventional system. A false alarm may be reduced or even avoided if the alarm threshold is increased, when planned or ongoing acoustic disturbance due to an external activity is considered.

According to an embodiment of the present invention, the method further comprises determining initial calibration parameters, in particular alarm thresholds and/or sensitivity factors and/or sensitivity levels, for all subregions of the ground soil region, resetting the calibration parameters in response to the information about a temporal change of an acoustic transfer characteristic of the ground soil region, in particular reducing the alarm thresholds corresponding to subregions where precipitation occurs, in particular increasing the sensitivity factors or levels in subregions where ground frost occurs.

It should be understood that features individually disclosed, described, explained or provided for a method for calibrating an optical sensing system, in particular a distributed acoustic optical sensing system, also apply, individually or in any combination, to an distributed fiber optic (acoustic) sensing system according to embodiments of the present invention and vice versa.

According to an embodiment of the present invention it is provided a distributed fibre optic (acoustic) sensing system comprising a light source for generating pulses of coherent light, an optical fibre arranged at least partly in a region of ground soil to guide the light, a photo detector for detecting scattered light returning from the optical fibre in dependence of time, an information receiver configured to obtain information from which a temporal change of an acoustic transfer characteristic of the ground soil region is derivable, and a calibrator configured to calibrate the distributed acoustic sensing system based on the changed acoustic transfer characteristic.

The distributed acoustic sensing system may be adapted to perform a method for calibration according to an embodiment of the present invention.

DETAILED DESCRIPTION OF ILLUSTRATED EMBODIMENTS

Embodiments of the present invention are now described and illustrated in the accompanying drawings. The invention is not restricted to the described or illustrated embodiments.

Embodiments of the present invention provide an innovative calibration procedure for a distributed fibre optic sensing system and more particularly but not exclusively of a distributed acoustic sensing system, to overcome the misinterpretation of a disturbance as mentioned in the conventional system. It should be noted that elements or structures similar in structure and/or function in the different FIGS. 1 to 5 are labelled with reference signs only differing in the first digit. A description of an element not in detail described in a particular embodiment may be taken from the description of this element in another embodiment illustrated in FIGS. 1 to 5.

Figure 1:
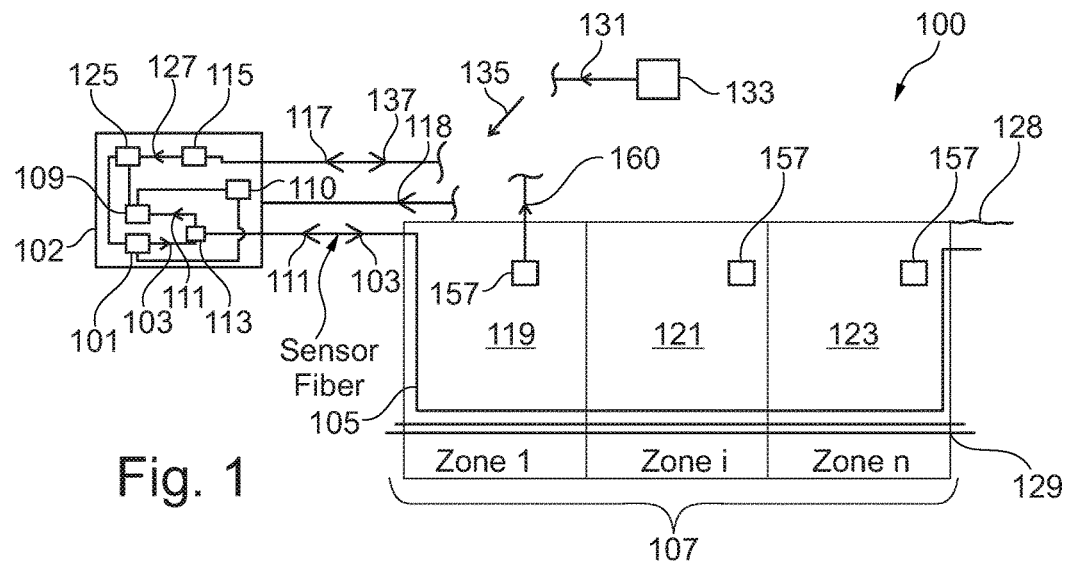
FIG. 1 schematically illustrates a distributed acoustic sensing system according to an embodiment of the present invention.

FIG. 1 schematically illustrates a distributed acoustic sensing system 100 according to an embodiment of the present invention which is adapted to carry out or perform a method for dynamically calibrating a distributed fibre optic (acoustic) sensing system according to an embodiment of the present invention.

The system 100 comprises, in particular integrated in a DAS interrogator 102, a light source 101 for generating pulses of coherent light 103. The system 100 further comprises an optical fibre 105 arranged at least partly in a region of ground soil 107, wherein the optical fibre 105 is enabled to guide the light 103. The optical fibre 105 is arranged close to an object 129 to be monitored, such as a pipeline, an electrical cable, a tube or the like. The system 100 further comprises a photo detector 109 for detecting, in dependence of time, scattered light 111 returning from the optical fibre 105. Using a splitter 113, the generated light 103 is coupled into the optical fibre 105 and the returning light 111 is guided to the photo detector 109.

The system 100 further comprises an information receiver 115 which is configured to obtain information 117 from which a temporal change of an acoustic transfer characteristic of the ground soil region 107, in particular spatially resolved in a number of subregions 119, 121, 123 is derivable. The system 100 further comprises a calibrator 125 which is configured to calibrate the distributed acoustic sensing system 100 based on the changed acoustic transfer characteristic 127 which is in the illustrated embodiment output by the information receiver 115.

As can be appreciated from FIG. 1, the optical fibre 105 is arranged below the surface of the earth 128 in different subregions 119, 121, 123 of the ground soil region 107. The ground soil characteristic, such as material, particle size, physical properties, chemical properties in the different subregions 119, 121 and 123 may be different, resulting in different acoustic transfer characteristics 127.

The information 117 comprises spatially resolved information pertaining to the different subregions 119, 121 and 123. According to the embodiment illustrated in FIG. 1, the information 117 is derived or comprises weather information 131 which is available (e.g. over the Internet or other network) from a source 133 and supplied to the information receiver 115 electrically wire-based, optically wire-based or wirelessly as schematically illustrated by the arrow 135. Obtaining the information 117 may involve a bidirectional communication in which for example coordinates or localization data 137 are sent to the weather information source 133 and the weather data 131 comprise region-specific weather information, in particular regarding the different subregions 119, 121, 123.

In the case of work parties in the vicinity of the sensor cable, the information 117 may be received at the processor 110 and may be used to adjust the alarming threshold of the measurement system. Another way to gather information that can be used to adjust the alarming threshold or to verify an alarm is to use a so-called drone which may operate semi- or fully autonomous. The usage of such additional gathered information from external databases may enable to reduce the false alarms of the measurement system. It may also be possible to use said additional gathered information not only in combination with the vibration measurements of a distributed acoustic sensor but also in combination with a distributed temperature sensor (DTS) in order to reduce the false alarms.

In an exemplary embodiment of the invention, the sensor fibre 103 is divided into virtual sensing sections along the sensor cable. During an initial calibration alarming thresholds are chosen for each of the sensing sections, whereby identical alarming thresholds may be chosen for different sensing sections. A re-calibration step or additional gathered information may be used to vary the alarming threshold in dependency of said additional information. The alarming threshold can be both increased and decreased as well by the additional information. For example the online weather database replies a strong rainfall along one or more sensing sections, and the alarming threshold is reduced along these sections. Changing weather conditions along said sensing sections may increase the alarming threshold, subsequently.

In another exemplary embodiment of the invention, the sensor fibre 103 is divided into virtual sensing sections along the sensor fibre 103. During an initial calibration sensitivity data are chosen for each of the sensing sections, whereby identical sensitivity data may be chosen for different sensing sections. A re-calibration step or additional gathered information is used to vary the pre-selected sensitivity data in dependency of said additional information. The sensitivity data can be both increased and decreased as well by the additional information. For example the online weather database replies a cold night with ground frost along one or more sensing sections, and the sensitivity data are increased along these sections. Changing weather or temperature conditions along said sensing sections may reduce the sensitivity data, subsequently.

In yet another exemplary embodiment of the invention, the sensor fibre 103 is divided into virtual sensing sections along the sensor cable. During an initial calibration sensitivity data are chosen for each of the sensing sections, whereby identical sensitivity data may be chosen for different sensing sections, and each of the sensing sections has more than one single related sensitivity data. In particular, the sensitivity data may comprise at least two, more particularly three, and even more particularly four sensitivity levels. The additional gathered information may change the sensitivity data in a way that the current sensitivity level is either increased or decreased. For clarity it is worth to mention that the highest sensitivity level cannot be further increased as well as the lowest sensitivity level cannot be decreased further. In case of maximum level of sensitivity level is set and the additional data indicate a further increase—which is maybe not possible in the selected setting of the measuring system—a corresponding message is written into the measuring system's log file. The same procedure is also true vice versa in case of that the minimum level of sensitivity is already reached and additional information indicates that the sensitivity level should be reduced further.

The features of embodiment 100 illustrated in FIG. 1 may be applied also to the other embodiments illustrated in FIG. 2 to FIG. 5 and vice versa.

Figure 2:
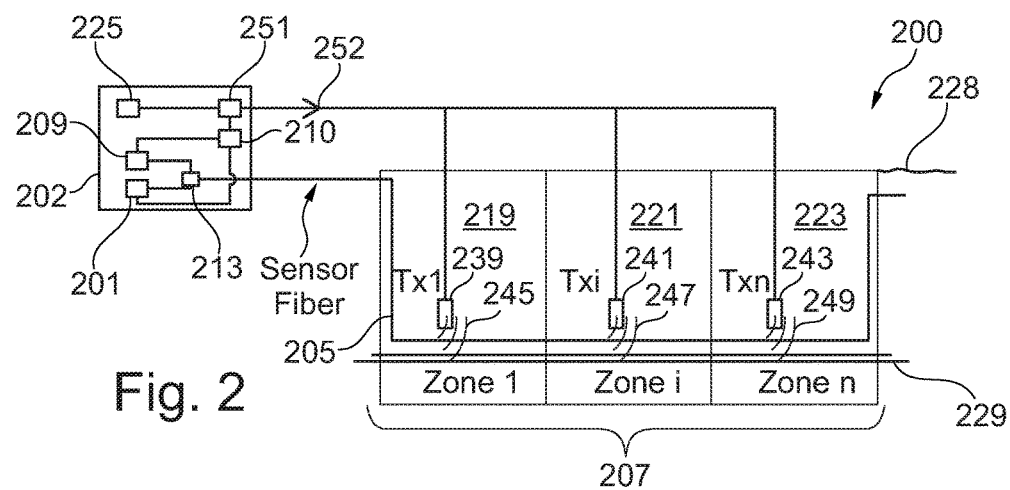
FIG. 2 schematically illustrates another distributed acoustic sensing system according to an embodiment of the present invention.

FIG. 2 illustrates another distributed acoustic sensing system 200 according to an embodiment of the present invention. Differing from the embodiment illustrated in FIG. 1, the system 200 further comprises acoustic sources 239, 241 and 243 in the different subregions 219, 221 and 223. The acoustic sources 239, 241, 243 may for example comprise a loudspeaker and associated circuitry and energy supply. The acoustic sources 239, 241 and 243 are adapted to generate predetermined acoustic patterns 245, 247 and 249 which are then transferred or transmitted through at least a portion of the respective subregions 219, 221, 223 of the ground soil region 207 towards a respective section of the optical fibre 205 in the same subregion. An intensity pattern for each of the subregions 219, 221 and 223 is detected using the optical fibre and the photo detector 209 and the processor 110 processes the received backscattered light and also controls the light source 201.

Based on the comparison of the generated and transmitted predetermined acoustic pattern 245, 247 and 249 and the respective signals as detected by the photo detector as guided back by the optical fibre 205, a calibration may be performed, in particular when the acoustic transfer properties or acoustic transfer characteristics in the different subregions 219, 221, 223 change, such as due to changing water content. The acoustic sources 239, 241, 243 are controlled by the driver 251 by control signals 252 which is controlled by the processor 210.

The information receiver may in this embodiment at least partly be formed by the photo detector 209 and the processor 210. Additionally and optionally, also in the embodiment 200 illustrated in FIG. 2, additional information from the Internet may be received as described in the system 100 illustrated in FIG. 1.

Figure 3:
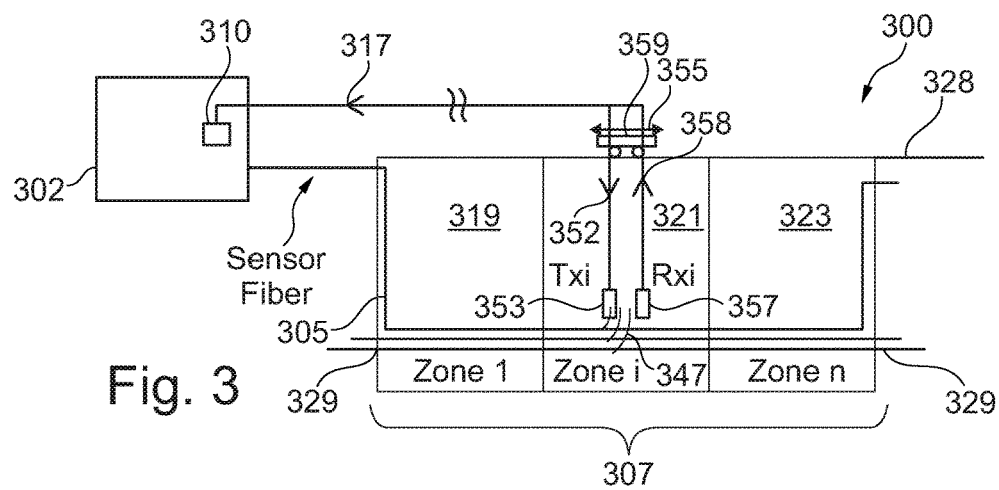
FIG. 3 schematically illustrates a further distributed acoustic sensing system according to an embodiment of the present invention.

FIG. 3 illustrates another distributed acoustic sensing system 300 according to an embodiment of the present invention. In this embodiment, a movable acoustic source 353 is provided which is adapted to be moved in a horizontal direction 355, i.e. substantially parallel to the surface 328 of the earth above the optical fibre 305. Furthermore, the system 300 comprises a movable receiver 357 which is adapted to detect a predetermined acoustic signal 347 transmitted through a portion of one of the subregions 319, 321 and 323. In particular, the acoustic source 353 and the acoustic receiver 357 may be mounted on a vehicle 359 which is adapted to drive on the surface 328 of the earth. The acoustic receiver 357 may for example be implemented as a microphone or a geophone. In the embodiment illustrated in FIG. 3, the predetermined acoustic signal 347 is detected using the acoustic receiver 357. Thus, in the present embodiment, the information 317 from which a temporal change of the acoustic transfer characteristic of the ground soil region 307 is derivable comprises measurement data 358 of the acoustic receiver 357. The measurement information 117 is provided to the processor 310 which together with the receiver may represent an information receiver 315. One or more movable acoustic sources and acoustic receivers may be provided. Additionally, also the system 300 illustrated in FIG. 3 may also receive information regarding weather in the different subregions, as is explained and illustrated in FIG. 1.

Figure 4:
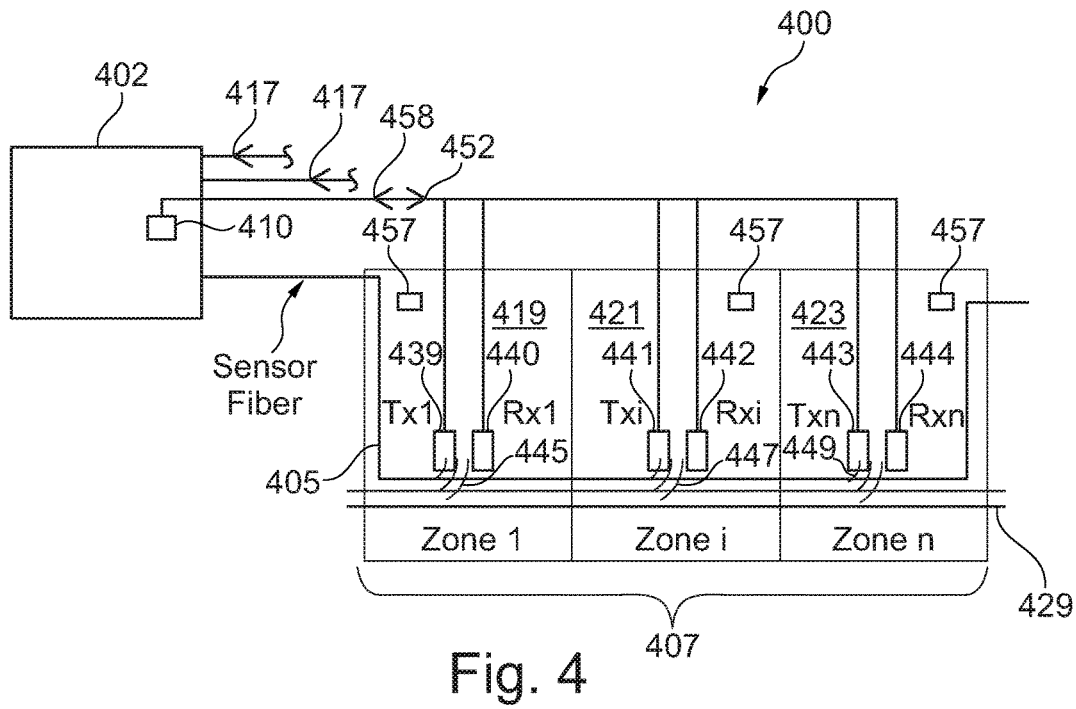
FIG. 4 schematically illustrates a still further distributed acoustic sensing system according to an embodiment of the present invention.

FIG. 4 illustrates another system 400 of a distributed acoustic sensing system according to an embodiment of the present invention. Herein, in each of the subregions 419, 421, 423, a pair of an acoustic source 439, 441, 443 and an associated acoustic receiver 440, 442, 444 is provided. The acoustic sources 439, 441, 443 generate dynamically at different time points (in particular when the external conditions change) predetermined acoustic signals 445, 447, 449 which are transferred through a portion of the ground soil and which are received by the respective acoustic receivers 440, 442, 444. The measurement data 458 are supplied to the processor 410. The processor 410 also receives measurement results detected by the photo detector 409 which are due to the acoustic disturbance caused by the acoustic signals 445, 447 and 449 and sensed by the optical fibre 405. The processor 410 compares the results and adjusts at least one calibration parameter of the system 400 based on the comparison results.

According to this embodiment, an interrogator 402 (e.g. configured as in FIG. 1, 2, 3) is provided for signal generation and interpretation connected to the optical fibre 405. Thereby, at least one transmitter 439 (also referred to as Tx1) is buried in the ground housing the optical sensor fibre 405 and at least one receiver 440 (also labelled as Rx1) colocated with the optical fibre 405 to be exposed to similar soil properties. The number of transmitters Tx and receivers Rx may depend on the partition of the area 407 that accommodates the sensor fibre 405 into zones or subregions 419, 421, 423 with similar physical/chemical properties. According to an embodiment, several pairs of transmitters and receivers may be provided in a single subregion or zone.

As can be appreciated from FIG. 4, the transmitters 439, 441, 443 and the receivers 440, 442, 444 are installed near the sensor fibre 405. Tx may be deployed in such a way that a sufficient part of the sensor fibre 405 (for example 10 m) can be covered. The position of the receiver Rx may be chosen to be in the vicinity of the sensor fibre itself.

According to one embodiment, the acoustic source Tx may be a transducer that converts for example an electrical signal into the target physical quantity (e.g. an acoustic signal, a heat pulse, electromagnetic wave) to generate the disturbance on the sensor fibre 405. For a distributed acoustic system Tx may for example include an electroacoustic device such as a loudspeaker, a tactile transducer, etc. or an electromechanical device such as a motor, or any combination of them. Some embodiments of Rx is a transducer that converts the transmitted physical quantity into for example an electrical signal. Especially for a distributed acoustic system, Rx may include an acoustoelectric device such as a microphone, a geophone, a hydrophone, etc. or any combination of them. Tx and Rx may also be combined in a transceiver apparatus for ease of installation.

The interrogator 402 may in a first step generate predetermined signal patterns 445, 447, 449 transmitted via Tx through the surrounding medium to the sensor cable and Rx. The predefined pattern may include reference signals at specified frequencies and signals of direct perturbations, such as simulated acoustic leak signals, or indirect perturbations, such as simulated excavation signals, etc. These patterns may be previously saved in a database of the interrogator 402 based on preliminary simulation tests. The received acoustic spectral response by Rx and the retrieved acoustic spectral response generated from the disturbance on the reflected optical signal in the sensor fibre 405 are transferred to the interrogator 402. The transfer of the reference signal from the interrogator to Tx and the Rx signal to the interrogator can be carried out electrically via an electrical cable, optically via an optical fibre or also wirelessly over radio frequencies for example.

The next step in the calibration procedure may be performed by comparing the Rx signal with the sensor fibre signal in every subregion 419, 421 and 423. Depending on the difference between the respective signal pair, a frequency-dependent correction factor may be determined, while the system and alarm parameters, such as the interrogator emitter and receiver input and output values, the alarming threshold values, the amplifier gain, the sampling frequency, etc. are adapted. This procedure may be repeated successively until the difference between the Rx and the fibre signal converge. In case of a non-convergence, the Rx signal may be added to the database to be used as a reference signal.

Due to the possible temporal changes of the soil property in the subregions 419, 421, 423 caused for example by changing weather conditions (in particular precipitation or rainfall), the calibration procedure may be re-executed at defined or predefined time intervals at the corresponding subregion. By periodically recalibrating the distributed sensing system, an incorrect interpretation of the perturbation or non-alarming of the threat can be avoided, offering a dynamic calibration of the distributed fibre optic sensing system. This type of process can provision an early warning method for changes in the installation conditions by providing a heartbeat signal ensuring that normal operation and asset conditions are guaranteed. The Tx/Rx units or transceivers may be also combined with other sensor types, such as humidity sensor 457 arranged in the different subregions. Thereby, water content may be measured.

In the conventional systems, insufficient calibration measurements may generate false alarms. Thus, a further aim or purpose of the present invention is to reduce the false alarm rate at the measurement system. Therefore, it is conceivable to re-execute the calibration procedure very often. Though unnecessary calibration procedures will be done which reduces the availability of the measuring system. It is therefore proposed in addition to a regular or initial calibration procedure, to perform additional calibration procedures automatically—but only when changes in environmental conditions are expected. For solving this subproblem it is suggested that additional available information 417, 418 (for example on-line weather information or information about current work parties in the vicinity of the sensor cable) will be used with the measurement system. In the case of weather information, the task is solved for example by query and online weather database, as is explained with reference to FIG. 1. Nowadays, a lot of such weather databases are available on-line and offer a so-called application programming interface (API). Selected geographical coordinates along the fibre optical sensor 405 may be transmitted to the weather database and rainfall and temperature data may be received thereupon. The query of the database is done by a processing unit, such as for example processor 410 which can either be embedded in the interrogator or be a processing unit linked to the DAS measurement device.

The received weather data may be triggering further actions as depending on the pre-selected threshold for rainfall, and may trigger a calibration measurement. A threshold of rainfall may be individually selected by the system operator. The calibration method may then be applied when the properties of the medium surrounding the sensor cable change. Thus, the calibration method does not necessarily be carried out at periodic time intervals.

In order to reduce the number of calibration units to be installed, at least one mobile apparatus can be used. This possible implementation is shown in FIG. 3. In this case, the apparatus can be moved manually or automatically from one zone to another depending on the soil properties in each region. A combination of the embodiments in FIG. 4 and FIG. 3 can also be realized.

A possible embodiment of the calibration apparatus can be realized using at least one acoustic source Tx without the use of an additional acoustic receiver Rx, as illustrated in FIG. 2. In this case, the calibration procedure is performed by comparing the sensor fiber signal at the corresponding zone directly with the Tx signal. The other calibration steps including the signal transmission, system alarm parameters adjustment, etc. are similarly applied in this embodiment. A combination of the embodiments in FIG. 2 and FIG. 4 without Rx and using separate optical fibers or a combination of the embodiments in FIG. 3 and FIG. 2 with a movable unit is possible. This embodiment applies also using the apparatus illustrated in FIG. 4. In this case, Rx can be installed, initially omitted, and used afterwards if the fiber exhibits aging effects and/or the variations between the Tx and fiber signals are considerable.

Figure 5:
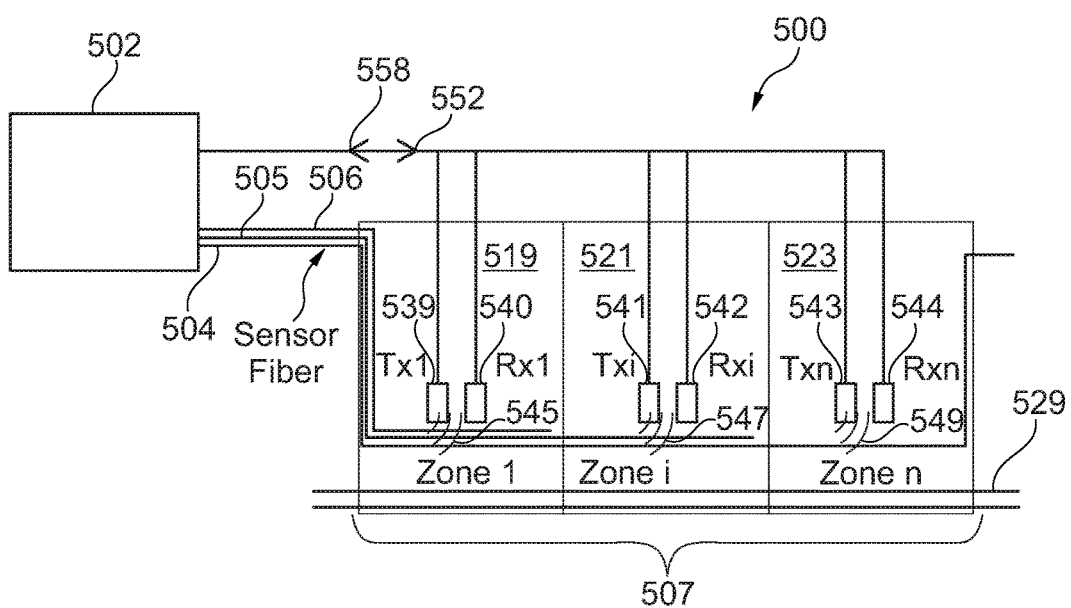
FIG. 5 schematically illustrates another further distributed acoustic sensing system according to an embodiment of the present invention.

FIG. 5 illustrates another distributed acoustic sensing system 500 according to an embodiment of the present invention which has many similarities with the system 400 illustrated in FIG. 4. Differing from the system illustrated in FIG. 4, the system 500 comprises for each subregion an associated optical fibre 504, 505, 506. Using more than one optical fibre for measuring disturbances may improve the accuracy and reliability of the results.

The overall received signal from the disturbances on the fiber in all zones may be described as function of time t as $u(t)=\Sigma_{i=1}^{n} u_i(t-t_i)$. The localization of each received disturbance $u_i(t)$ can be done by analyzing the total signal at each time stamp $t_i$, which depends on the disturbance distance from the interrogator $l_i$ and the speed of light in the fiber c as $$t_i = 2\frac{c}{l_i}.$$

Alternatively, the zone assignment can be based on a physical separation of the sensor sections by using a separate fiber for each zone in a single or multiple fiber cables. The interrogator 502 includes in this case multiple outputs and a switching device to feed each fiber separately.

The invention claimed is:

1. A method for dynamically calibrating a distributed fibre optic sensing system comprising a light source for generating pulses of coherent light, an optical fibre arranged at least partly in a ground soil region to guide the light, and a photo detector for detecting scattered light returning from the optical fibre in dependence of time, the method comprising:
   obtaining information from which a temporal change of an acoustic transfer characteristic of the ground soil region is derivable; and
   calibrating the distributed fibre optic system based on the changed acoustic transfer characteristic,
   wherein obtaining the information comprises:
   obtaining influence information about an influence factor effecting the temporal change of the acoustic transfer characteristic; and
   estimating a changed acoustic transfer characteristic based on the influence information.

2. The method according to claim 1, wherein obtaining the information comprises obtaining spatially resolved information pertaining to at least two subregions of the ground soil region.

3. The method according to claim 1, wherein obtaining the influence information comprises acquiring weather information regarding atmospheric precipitation from a weather information source.

4. The method according to claim 3, wherein geographical coordinates along the optical fiber are transmitted to the weather information source and spatially resolved atmospheric precipitation data are received.

5. The method according to claim 3, wherein, depending on whether the atmospheric precipitation data indicate fallout above a threshold in at least one of the subregions, calibrating is initiated in the respective subregion.

6. The method according to claim 3, wherein based on the atmospheric precipitation data the acoustic transfer characteristic of the ground soil region is estimated.

7. The method according to claim 1, wherein humidity data of the ground soil region is determined by measuring using humidity sensors or by estimating using atmospheric precipitation data and a ground soil characteristic,
   wherein acoustic transfer characteristic of the ground soil region is estimated from humidity data and the ground soil characteristic.

8. The method according to claim 1, wherein obtaining the information comprises:
   measuring a temporal change of an acoustic transfer characteristic of the ground soil region,
   wherein measuring the temporal change of an acoustic transfer characteristic of the ground soil region comprises:
   generating a predetermined acoustic pattern from at least one acoustic source in a vicinity of the optical fibre at least two locations;
   transmitting the generated acoustic pattern through at least a portion of the ground soil region; and
   detecting an intensity pattern of the transmitted acoustic pattern.

9. The method according to claim 8, wherein the acoustic source is movable and is mounted on a vehicle configured to drive on a surface of the earth above the optical fibre.

10. The method according to claim 9, wherein the vehicle has a geophone attached that is partly inserted from above the surface into the soil ground region for detecting the transmitted acoustic pattern.

11. The method according to claim 8, wherein detecting the transmitted acoustic pattern comprises:
    detecting the transmitted acoustic pattern using the distributed fibre optic sensing system.

12. The method according to claim 8, wherein detecting the transmitted acoustic pattern comprises:
    detecting the transmitted acoustic pattern using at least two acoustic receivers located at different locations near the optical fibre.

13. The method according to claim 8, wherein calibrating comprises:
    comparing the transmitted acoustic pattern detected by the distributed fibre optic sensing system and the transmitted acoustic pattern detected by at least two acoustic receivers; and
    adjusting at least one calibration parameter of the acoustic sensing system based on the comparison/difference.

14. The method according to claim 1, wherein a calibration parameter comprises at least one of:
    an alarm threshold, a light source intensity, a receiver sensitivity/amplification gain, a spatial resolution, a sampling frequency, a pulse width.

15. The method according to claim 1, further comprising:
    initially calibrating the distributed acoustic sensing system based on a known initial acoustic transfer characteristic of the ground soil region in at least two subregions of the ground soil region.

16. The method according to claim 1, wherein the calibrating is automatically triggered when a change of acoustic transfer characteristic is indicated.

17. The method according to claim 1, further comprising:
    receiving information regarding planned or ongoing acoustic disturbances in at least one subregion of the ground soil region;
    adjusting an alarm threshold of the distributed fibre optic sensing system in the respective subregion, in order to reduce false alarm.

18. The method according to claim 1, further comprising:
    determining initial calibration parameters for all subregions of the ground soil region;
    resetting the calibration parameters in response to the information about a temporal change of an acoustic transfer characteristic of the ground soil region.

19. A distributed fibre optic sensing system, comprising:
    a light source for generating pulses of coherent light;

an optical fibre arranged at least partly in a region of ground soil to guide the light;
a photo detector for detecting scattered light returning from the optical fibre in dependence of time;
an information receiver configured to obtain information from which a temporal change of an acoustic transfer characteristic of the ground soil region is derivable,
wherein obtaining the information comprises:
obtaining influence information about an influence factor effecting the temporal change of the acoustic transfer characteristic; and
estimating a changed acoustic transfer characteristic based on the influence information;
the distributed fibre optic sensing system further comprising:
a calibrator configured to calibrate the distributed fibre optic sensing system based on the changed acoustic transfer characteristic.

\* \* \* \* \*